US009104937B2

(12) United States Patent
Kim et al.

(10) Patent No.: US 9,104,937 B2
(45) Date of Patent: Aug. 11, 2015

(54) APPARATUS AND METHOD FOR RECOGNIZING IMAGE WITH INCREASED IMAGE RECOGNITION RATE

(71) Applicant: Samsung Electronics Co., Ltd., Gyeonggi-do (KR)

(72) Inventors: Po-Ra Kim, Seoul (KR); Jeong-Seok Choi, Gyeonggi-do (KR); Kang-Nam Kim, Gyeonggi-do (KR); Se-Mi Park, Seoul (KR); Seong-Min Seo, Gyeonggi-deo (KR); In-Kuk Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 227 days.

(21) Appl. No.: 13/647,822

(22) Filed: Oct. 9, 2012

(65) Prior Publication Data
US 2013/0088463 A1  Apr. 11, 2013

(30) Foreign Application Priority Data

Oct. 7, 2011  (KR) ........................ 10-2011-0102502

(51) Int. Cl.
*G06F 3/03* (2006.01)
*G06K 9/20* (2006.01)
*G06K 9/22* (2006.01)

(52) U.S. Cl.
CPC ............ *G06K 9/2027* (2013.01); *G06K 9/2036* (2013.01); *G06K 9/228* (2013.01)

(58) Field of Classification Search
None
See application file for complete search history.

(56) References Cited

U.S. PATENT DOCUMENTS

2011/0090178 A1* 4/2011 Lai et al. ........................ 345/179

* cited by examiner

*Primary Examiner* — Joseph Haley
(74) *Attorney, Agent, or Firm* — The Farrell Law Firm, P.C.

(57) ABSTRACT

An apparatus and methods for recognizing an image with an increased image recognition rate are provided. The apparatus includes a plurality of illuminators for illuminating a surface. The apparatus also includes an image sensor for outputting an image frame obtained by converting an optical image of the surface into an electrical signal. The surface is illuminated one of the plurality of illuminators. The apparatus further includes a switch for selecting any of the plurality of illuminators for illuminating the surface. The apparatus additionally includes a controller for receiving the image frame from the image sensor, determining whether the image frame has a region of reflected light, and controlling the switch to select another of the plurality of illuminators to illuminate the surface when the image frame has the region of reflected light.

13 Claims, 6 Drawing Sheets

APPARATUS AND METHOD FOR RECOGNIZING IMAGE WITH INCREASED IMAGE RECOGNITION RATE

PRIORITY

This application claims priority under 35 U.S.C. §119(a) to a Korean Patent Application entitled "Apparatus and Method for Recognizing Image for Increasing Image Recognition Rate" filed in the Korean Intellectual Property Office on Oct. 7, 2011 and assigned Ser. No. 10-2011-0102502, the contents of which are incorporated herein by reference.

BACKGROUND OF THE INVENTION

1. Field of the Invention

The present invention relates generally to an apparatus for recognizing an image, and more particularly, to an apparatus and a method for recognizing an image with an increased image recognition rate by using multiple illuminators.

2. Description of the Related Art

An image sensor installed in a digital camera or the like is known to be mounted on a mobile communication terminal, such as, for example, a mobile phone or a smart phone. The image sensor of the mobile communication terminal has been used as an input means utilized in the pursuit of high performance and multi-functionalization, as well as a means for capturing an image and recording on a recording medium. The application of the image sensor has also been extended to an electronic pen. For example, in a smart phone that recognizes a Quick Response (QR) code and uses the recognized QR code as input information, an electronic pen can recognize a picture or a character through a panel on which a particular pattern is drawn.

The image sensor installed in a mobile phone, a smart phone, an electronic pen, etc. as described above may be used as an information input means. After the image sensor obtains an image, an apparatus for recognizing an image (e.g., the smart phone, the electronic pen, or the like) may recognize and output coordinates or a character, for example, through image processing. When capturing an image from the outside, the apparatus for recognizing an image requires lighting control. When a user captures an image, lighting control illuminates an object to be captured. The brighter the lighting, under which an image is captured, the higher an image recognition rate.

As described above, the apparatus for recognizing an image includes an illuminator that prevents an image from being captured under dim lighting when capturing the image. The apparatus for recognizing an image as described above usually includes a single illuminator, which may not allow the apparatus to properly recognize an image. For example, illuminance may be changed according to a direction in which the user holds an electronic pen in his/her hand and an angle at which the user holds the electronic pen in his/her hand. The changes in illumination combat reflected light caused by external lighting, which may make it difficult to recognize an image.

SUMMARY OF THE INVENTION

The present invention has been made to address at least the above problems and/or disadvantages and to provide at least the advantages described below. Accordingly, an aspect of the present invention provides an apparatus and a method for increasing an image recognition rate in an apparatus for recognizing an image.

Another aspect of the present invention provides an apparatus and a method for recognizing an image by controlling multiple illuminators that illuminate the image.

In accordance with an aspect of the present invention, an apparatus is provided for recognizing an image with an increased image recognition rate. The apparatus includes a plurality of illuminators for illuminating a surface. The apparatus also includes an image sensor for outputting an image frame obtained by converting an optical image of the surface into an electrical signal. The surface is illuminated one of the plurality of illuminators. The apparatus further includes a switch for selecting any of the plurality of illuminators for illuminating the surface. The apparatus additionally includes a controller for receiving the image frame from the image sensor, determining whether the image frame has a region of reflected light, and controlling the switch to select another of the plurality of illuminators to illuminate the surface when the image frame has the region of reflected light.

In accordance with another aspect of the present invention, a method is provided for increasing an image recognition rate in an apparatus for recognizing an image. A surface is illuminated with one of a plurality of illuminators. An image frame generated by capturing the illuminated surface is received. It is determined whether the image frame has a region of reflected light. Another of the plurality of illuminators is changed to, when the image frame has the region of reflected light.

In accordance with a further aspect of the present invention, an article of manufacture is provided for increasing an image recognition rate in an apparatus for recognizing an image. The article of manufacture includes a machine readable medium containing one or more programs which when executed implement the steps of: illuminating a surface with one of a plurality of illuminators; receiving an image frame generated by capturing the illuminated surface; determining whether the image frame has a region of reflected light; and changing to another of the plurality of illuminators when the image frame has the region of reflected light.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide a method for increasing an image recognition rate in an apparatus for recognizing an image. An apparatus for recognizing an image, according to embodiments of the present invention, includes two or more illuminators. When receiving an image frame, the apparatus for recognizing an image counts the number of pixels in the image frame, which have brightness values greater than or equal to a predetermined brightness. When the counted number of pixels is greater than or equal to a predetermined number, the apparatus for recognizing an image changes a current illuminator to another illuminator. According to embodiments of the present invention as described above, an image having reflected light, a brightness of which is greater than or equal to a predetermined value, is not subjected to an operation for recognizing the image, but is subject to a change in lighting, so that it is possible to prevent the reduction of an image recognition rate.

Figure 1:
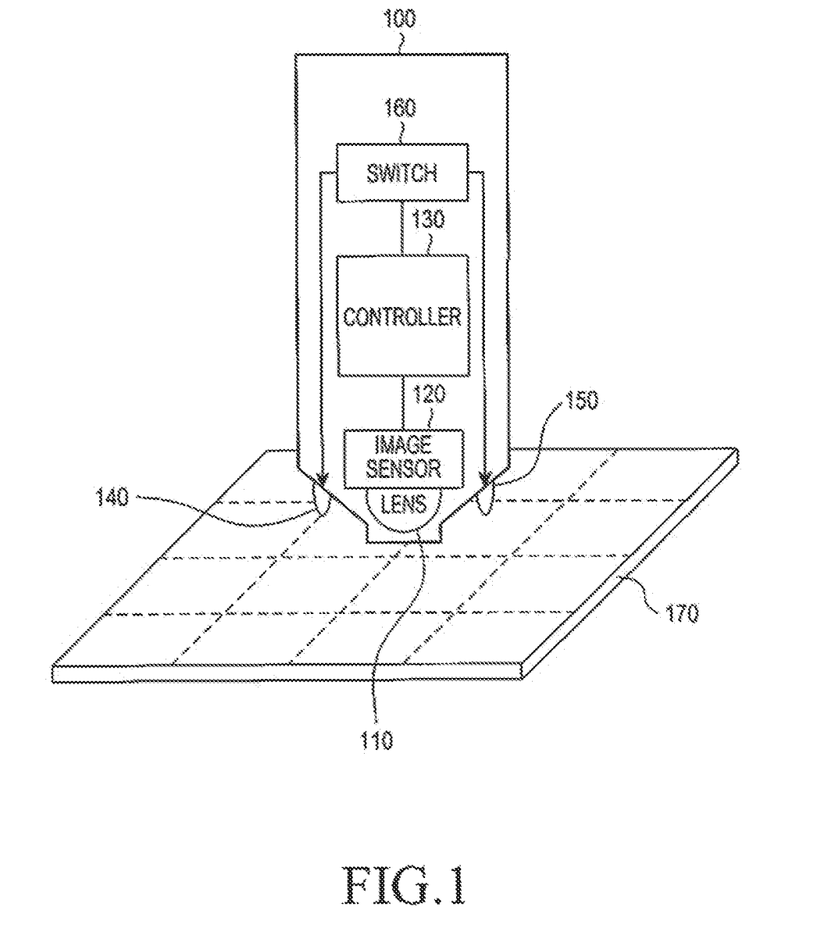
FIG. 1 is a diagram illustrating the configuration of an apparatus for recognizing an image, according to an embodiment of the present invention.

The configuration of the apparatus for recognizing an image, in which the functions described above are implemented, is described in detail below with reference to FIG. 1. FIG. 1 is a diagram illustrating the configuration of an apparatus for recognizing an image, according to an embodiment of the present invention. Although an electronic pen is illustrated as an example of the apparatus for recognizing an image in FIG. 1, the apparatus for recognizing an image according to embodiments of the present invention refers to all apparatuses including an image sensor, such as, for example, a smart phone. Hereinafter, elements other than those related to the operation of the electronic pen are less relevant to a description of embodiments of the present invention, and thus, are omitted.

Referring to FIG. 1, an electronic pen 100 includes a lens 110, an image sensor 120, a controller 130, illuminators 140 and 150, and a switch 160. Although two illuminators 140 and 150 are illustrated in FIG. 1, the number of an illuminators is preferably two or more. Also, an example of an illuminator in an embodiment of the present invention includes, for example, an LED illuminator.

The image sensor 120 refers to an element that converts an optical image received through the lens 110 into an electrical signal. Accordingly, the image sensor 120 outputs an image frame obtained by converting an optical image, generated by capturing a surface to be captured, into an electrical signal. The image sensor 120 may be embodied as a Charge Coupled Device (CCD) image sensor and a Complementary Metal-Oxide Semiconductor (CMOS) image sensor. The image sensor 120 captures a panel 170 on which a particular pattern is drawn, and recaptures it at predetermined time intervals. The image captured, as described above, is used to extract coordinates by recognizing a pattern in the image and decoding the recognized pattern. The panel 170 on which the particular pattern is drawn may be embodied as an electronic board. In the embodiments of the present invention, each of captured images that are continuously input as described above, is defined as an image frame.

Under the control of the controller 130, the switch 160 selects one or more of the illuminators 140 and 150, and delivers a control signal from the controller 130 to the selected one or more illuminators.

The controller 130 recognizes an image by using an image frame received from the image sensor 120. A low ambient illuminance, or reflected light, makes it impossible to recognize a received captured image, although the captured image is received from the image sensor 120. Particularly, when the captured image itself is dark, a contrast ratio becomes smaller, and thus an image recognition rate becomes lower. The brighter the lighting, under which an image is captured, the higher an image recognition rate. As described above, the control of lighting is essential to obtain an image having a brightness that is greater than or equal to a predetermined brightness required to recognize an image.

The controller 130, according to an embodiment of the present invention, determines whether a received image can be recognized. In an embodiment of the present invention, the number of pixels having brightness values greater than or equal to a reference brightness, is counted in an image frame. When the counted number of pixels exceeds a predetermined number, the controller 130 determines that reflected light exists, and performs a control operation for changing a current illuminator to another illuminator. In another embodiment of the present invention, after an image frame is divided into multiple regions, the controller 130 determines whether the divided regions include regions of reflected light. When the number of regions of reflected light exceeds a predetermined number, the controller 130 performs a control operation for changing a current illuminator to another illuminator. In another embodiment of the present invention, a histogram on the x-axis and a histogram on the y-axis are calculated in an image frame. The controller 130 determines a position of a region of reflected light by using the calculated histograms. When the position of the region of reflected light corresponds to a particular position, or when a size of the region of reflected light is greater than or equal to a predetermined size, the controller 130 performs a control operation for changing a current illuminator to another illuminator.

As described above, according to embodiments of the present invention, when a low illuminance or reflected light makes it difficult to recognize an image, another illuminator is selected instead of a current illuminator that illuminates the image. The image is then recognized by using the other illuminator.

A method of changing the current lighting to another lighting according to whether a region of reflected light exists in an image frame, according to an embodiment of the present invention, is described in detail below with reference to FIG. 2. In this embodiment of the present invention, a method shown in FIG. 2 may be applied to the recognition of an image among images continuously captured by the image sensor on a image frame-by-image frame basis. However, the method shown in FIG. 2 may also be applied to the recognition of an image among images continuously captured by the image sensor with a predetermined number of image frames as a unit. Also, this embodiment of the present invention is based on the premise that images captured are in a state illumination by any of the multiple illuminators of the apparatus for recognizing an image.

Figure 2:
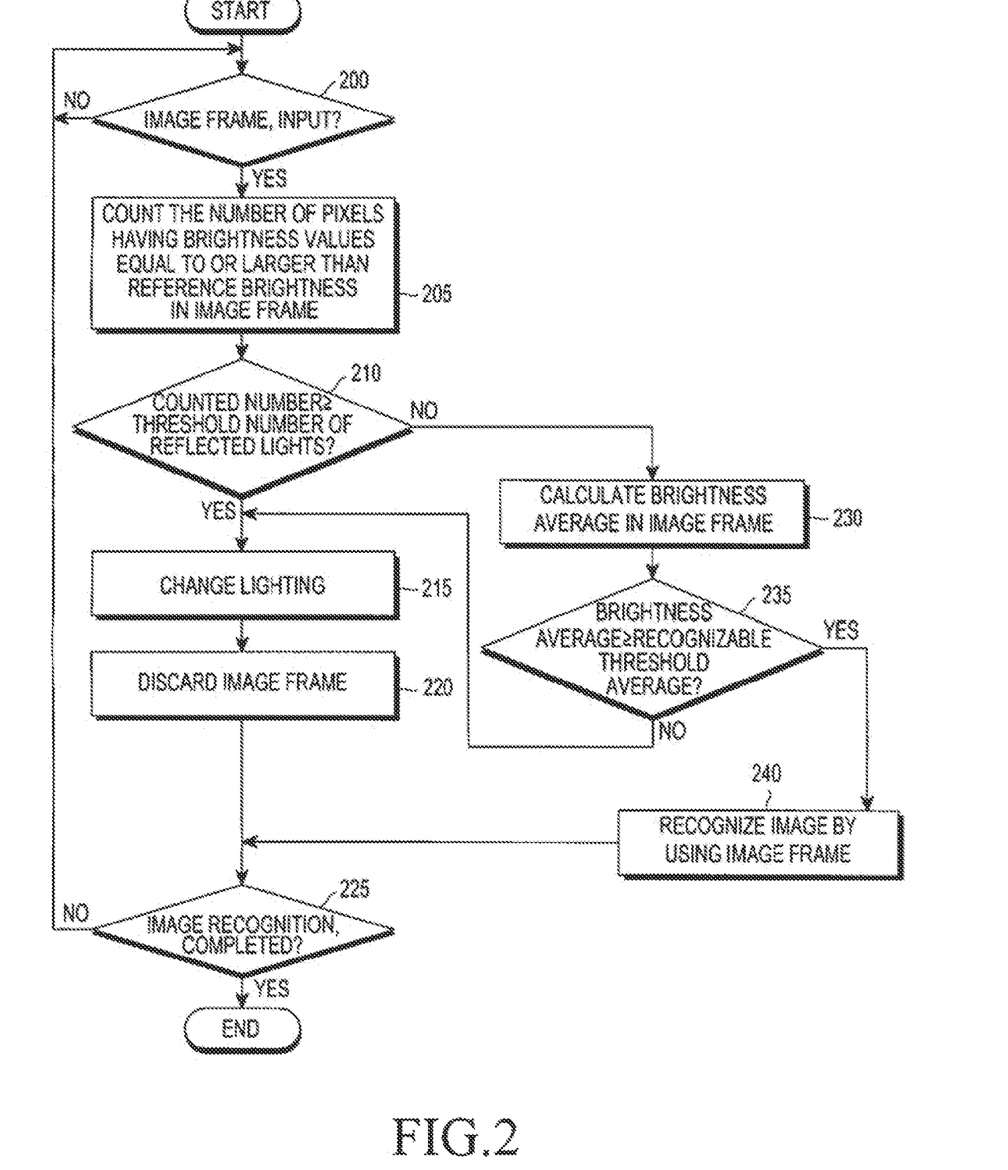
FIG. 2 is a flowchart illustrating the operation of an apparatus for recognizing an image, according to an embodiment of the present invention.

Referring to FIG. 2, when a surface to be captured is illuminated by any of the multiple illuminators, it is determined whether an image frame is input in step 200. When an image frame is input, the apparatus for recognizing an image counts the number of pixels in the input image frame, which have brightness values that are greater than or equal to a reference brightness, in step 205. Specifically, the apparatus for recognizing an image calculates a brightness of each pixel in the image frame, and counts the number of pixels that have calculated brightness values that are greater than or equal to the reference brightness. When reflected light is generated, Y values usually range from 255 to 0 in an image, in a YCbCr format. The greater the number of pixels having colors close to white, the greater the number of values having Y values close to 255.

In step 210, it is determined whether the counted number of pixels is greater than or equal to a threshold number of reflected lights. When the counted number of pixels is greater than or equal to the threshold number of reflected lights, it implies that a size of a region, where reflected light exists, is greater than or equal to a predetermined size. Therefore, in step 215, the apparatus for recognizing an image changes the current lighting to another lighting. Specifically, when the counted number of pixels is greater than or equal to the threshold number of reflected lights, the apparatus for recognizing an image regards a current image frame as having a region of reflected light, a brightness of which is greater than or equal to the reference brightness. A case in which the reflected light appears in the current image frame as described above, mostly occurs according to an angle of a current illuminator (e.g., when any one part of a panel reflects light generated from an illuminator). Therefore, the selection of another illuminator makes it possible to avoid reflected light.

In this embodiment of the present invention, the apparatus for recognizing an image determines whether reflected light exists in an image, by using the degree of the distribution of brightness values of pixels in the image. When a result of the determination shows that the image includes reflected light having an intensity that is greater than or equal to a predetermined intensity, the apparatus for recognizing an image changes the current illuminator to another illuminator. Thus, the apparatus for recognizing an image may predict that reflected light does not appear in the next image frame.

When the image frame, in which the counted number of pixels is greater than or equal to the threshold number of reflected lights is used to recognize an image, inaccurate coordinates are obtained in recognizing the image. Therefore, the image frame as described above is discard in step 220. The image frame may be discarded before the lighting is changed in step 215. The methodology then proceeds to step 225, where it is determined whether image recognition is completed.

Returning to step 210, when the counted number of pixels is less than the threshold number of reflected lights, the apparatus for recognizing an image calculates a brightness average in the image frame, in step 230. Determining that the counted number of pixels is less than the threshold number of reflected lights indicates that reflected light does not exist or that a size of a region of reflected light is less than or equal to a predetermined size. However, the inclination of an illuminator is so large at a particular angle that a low illuminance may cause an image to have such a brightness that the image cannot be recognized. Accordingly, a brightness average is calculated on all pixels in the image frame. Also, although reflected light is not generated, the selection of an image, which looks brighter according to an angle of capturing an image, can increase a success rate of recognizing the image. When an image is dark, a contrast ratio of the image becomes smaller, and thus an image recognition rate may also be lower. Therefore, the selection of a bright image can increase an image recognition rate.

The apparatus for recognizing an image determines whether the calculated brightness average is greater than or equal to a recognizable threshold average. Specifically, the apparatus for recognizing an image determines whether the overall brightness of all pixels in the image frame is greater than or equal to a predetermined reference.

When the calculated brightness average is less than the recognizable threshold average, it implies that the overall brightness of the image is dark. Thus, it is necessary to adjust a brightness by changing the current lighting, which illuminates the image, to another lighting. Accordingly, when the calculated brightness average is less than the recognizable threshold average, the apparatus for recognizing an image proceeds to step 215 and step 220, where it changes lighting and discards the image frame. However, when the calculated brightness average is greater than or equal to the recognizable threshold average, the image has such a brightness that the image can be recognized. Therefore, the apparatus for recognizing an image proceeds to step 240 where it recognizes the image by using the image frame. Thereafter, the apparatus for recognizing an image proceeds to step 225, where it determines if image recognition is completed. When image recognition is not completed, the methodology returns to step 200 and repeatedly performs the above process whenever an image frame is input. When image recognition is completed, the methodology terminates.

As described above, after discarding the image frame having the generated reflected light, the apparatus for recognizing an image changes the lighting, so as to enable the prevention of reflected light in the next image frame. Specifically, because the apparatus for recognizing an image may predict that the next image frame does not have reflected light by changing the lighting through a selective change from a current illuminator to another illuminator, it is possible to expect an increase in the number of effective image frames to be used to recognize an image.

Moreover, according to an embodiment of the present invention, because only an image frame, which has a brightness value equal to or larger than a predetermined brightness, is used to recognize an image, a position change is calculated on only images, which have been determined to be recognizable, through a subsequent comparison between images. Therefore, a picture or a character, which has been recognized with improved accuracy, can be output.

Figure 3:
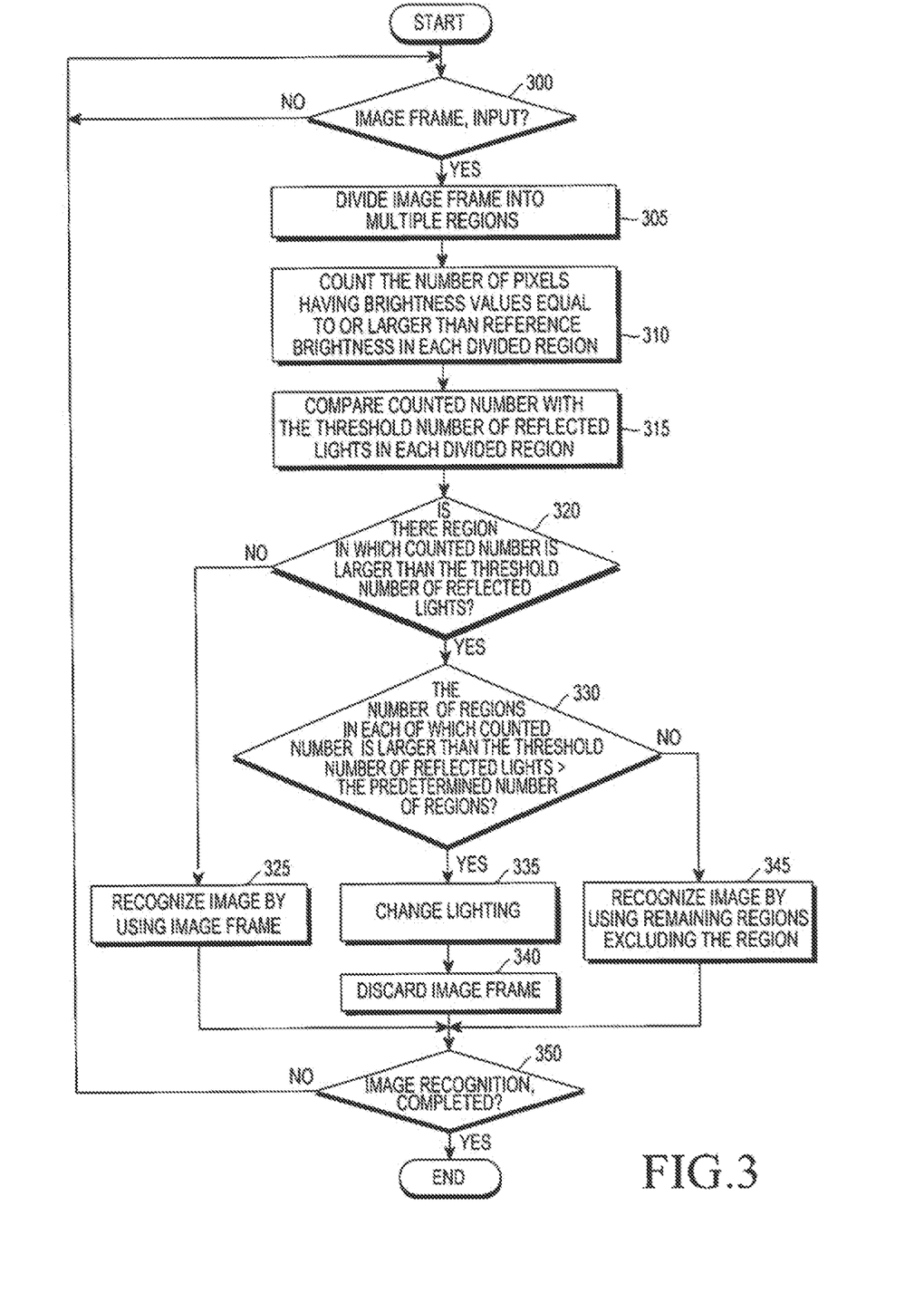
FIG. 3 is a flowchart illustrating the operation of an apparatus for recognizing an image, according to another embodiment of the present invention.
Figure 4:
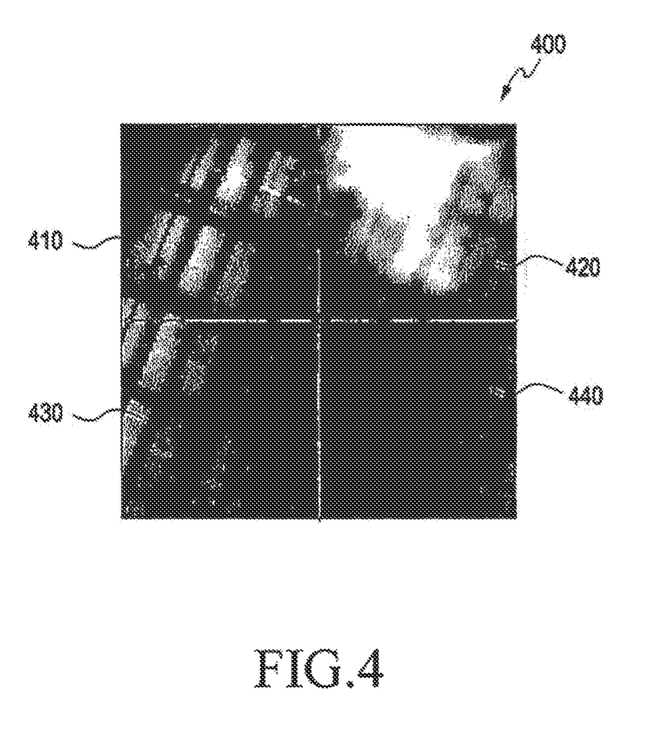
FIG. 4 is a diagram illustrating an image frame of FIG. 3, according to an embodiment of the present invention.

A method of changing the lighting according to reflected light in each region in an image frame, according to another embodiment of the present invention, is described in detail below with reference to FIG. 3. FIG. 3 illustrates an embodiment in which an image is recognized by using a remaining region, excluding a region having reflected light. The description of FIG. 3 is made together with FIG. 4, illustrating an image frame.

Referring to FIG. 3, it is determined whether an image frame is input, in step 300. When an image frame is input, in step 305, the apparatus for recognizing an image divides an image frame 400 into multiple regions 410, 420, 430 and 440, as shown in FIG. 4. In step 310, the apparatus for recognizing an image counts the number of pixels, which have brightness values greater than or equal to a reference brightness, in each divided region. In step 315, the apparatus for recognizing an image compares the counted number of pixels with the threshold number of reflected lights in each divided region. The comparison is for determining whether each region has reflected light. The apparatus for recognizing an image determines whether each region has reflected light, based on the number of pixels having brightness values greater than or equal to a predetermined brightness, as shown in FIG. 2.

In step 320, the apparatus for recognizing an image determines whether a region exists among the multiple regions, in which the counted number of pixels is greater than the threshold number of reflected lights. Specifically, the apparatus for recognizing an image determines a region of reflected light among the multiple regions. When a region of reflected light exists among the multiple regions, the apparatus for recognizing an image determines whether the number of regions, in which the counted number of pixels is greater than the threshold number of reflected lights, is greater than the predetermined number of regions. Specifically, when there is a larger number of regions of reflected light, a region to be used to recognize an image becomes smaller. Therefore, the apparatus for recognizing an image compares the number of regions of reflected light with the predetermined number of regions.

When the number of regions, in which the counted number of pixels is greater than the threshold number of reflected lights, is greater than the predetermined number of regions, the apparatus for recognizing an image changes the current lighting to another lighting, in step 335, and discards the current image frame, in step 340. The methodology then proceeds to step 350 to determine whether image recognition is completed.

When the number of regions, in which the counted number of pixels is larger than the threshold number of reflected lights, is less than or equal to the predetermined number of regions, the apparatus for recognizing an image recognizes an image by using the remaining regions, in step 345. The remaining regions exclude a region in which the counted number of pixels is larger than the threshold number of reflected lights. Accordingly, when reflected light exists, instead of discarding an image frame, the apparatus for recognizing an image recognizes an image by using remaining regions 410, 430 and 440 excluding a region 420 of reflected light, as shown in FIG. 4, so that an image recognition rate can be more improved. The methodology then proceeds to step 350 to determine whether image recognition is completed.

Returning to step 320, when a region, in which the counted number of pixels is greater than the threshold number of reflected lights, does not exist, the apparatus for recognizing an image recognizes an image by using the image frame, in step 325. The result of the determination in step 320 indicates that a region of reflected light does not exist, and thus, the image frame is used to recognize an image. Although a brightness average may be calculated on all pixels in the image frame as shown in FIG. 2, the embodiment of the present invention illustrated in FIG. 3 is based on the premise that a brightness average calculated on all pixels in an image frame is greater than or equal to a recognizable threshold average. The methodology then proceeds to step 350 where it is determined whether image recognition is completed. When image recognition is not completed, the apparatus for recognizing an image returns to step 300 and repeatedly performs the above process. When image recognition is completed, the methodology terminates.

Figure 5:
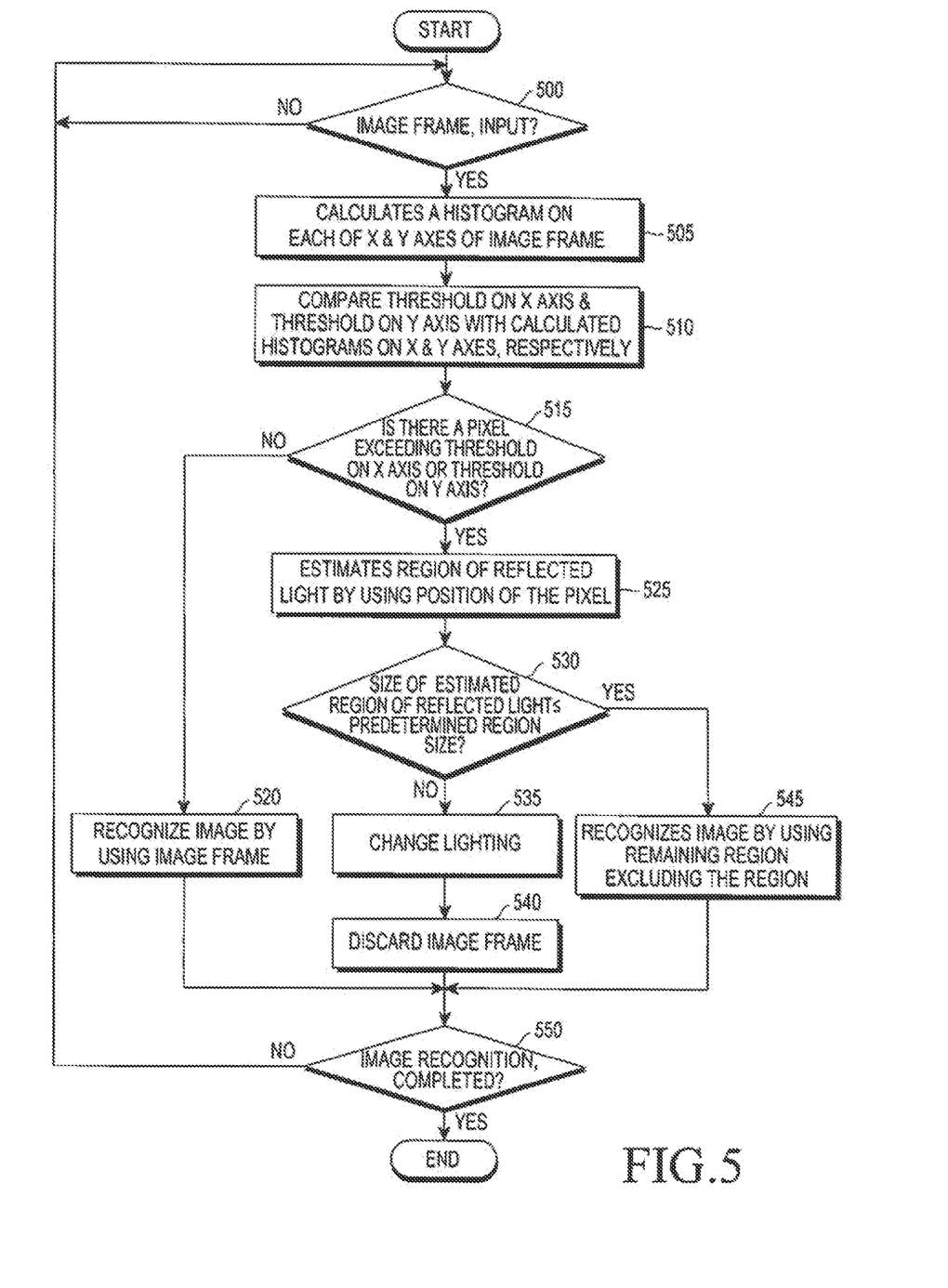
FIG. 5 is a flowchart illustrating the operation of an apparatus for recognizing an image, according to an embodiment of the present invention.
Figure 6:
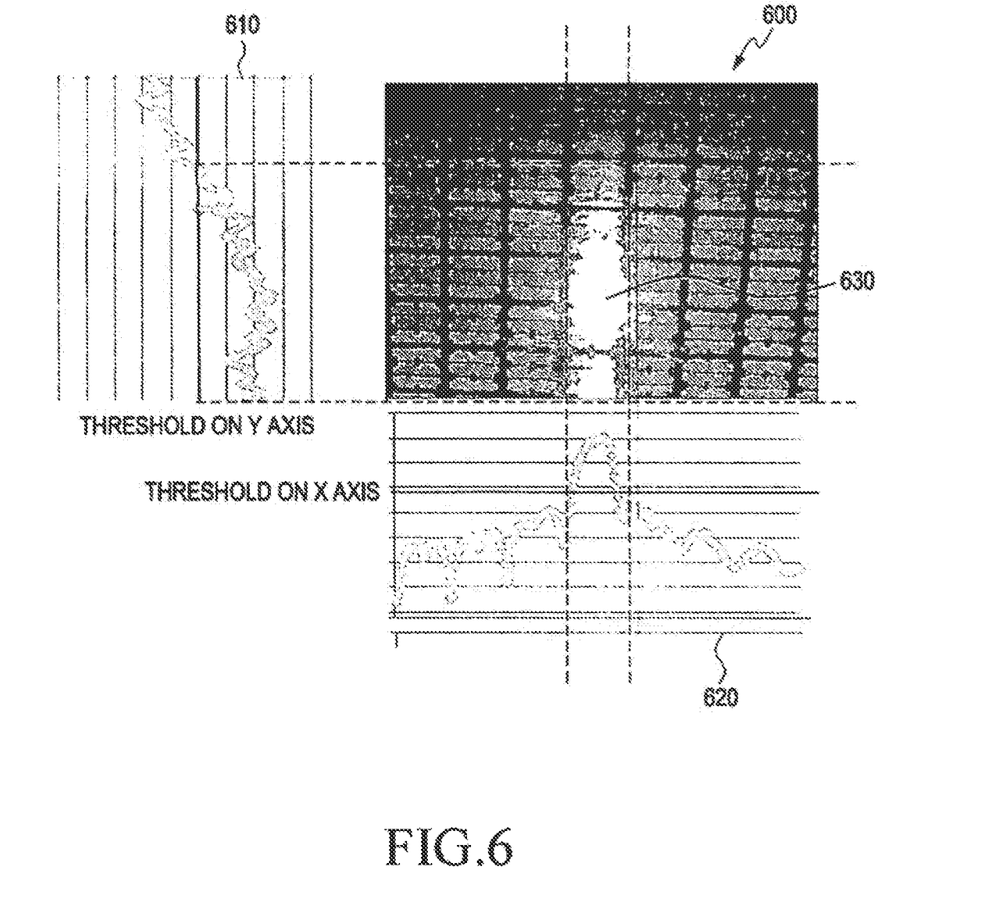
FIG. 6 is a diagram illustrating an image frame in FIG. 5, according to an embodiment of the present invention.

A method of changing the lighting according to the position of reflected light in an image frame, according to another embodiment of the present invention, is described in detail below with reference to FIG. 5. FIG. 5 illustrates an embodiment in which an image is recognized by using a remaining region, excluding a region of reflected light, in consideration of the position and the size of the region having reflected light. The description of FIG. 5 is made with reference to FIG. 6, illustrating an image frame.

Referring to FIG. 5, it is determined whether an image frame is input, in step 500. When an image frame is input, the apparatus for recognizing an image calculates a histogram on the x-axis and a histogram on the y-axis of the image frame, in step 505. Accordingly, a histogram 610 on the x-axis and a histogram 620 on the y-axis of an input image frame 600, are shown in FIG. 6.

The apparatus for recognizing an image compares the histogram on the x-axis and the histogram on the y-axis with a threshold on the x-axis and a threshold on the y-axis, respectively, in step 510. It is determined whether there is a pixel having a value that exceeds the threshold on the x-axis in the histogram on the x-axis, and whether there is a pixel having a value that exceeds the threshold on the y-axis in the histogram on the y-axis, in step 515. When there is no pixel having a value exceeding the threshold on the x-axis in the histogram on the x-axis and there is no pixel having a value exceeding the threshold on the y-axis in the histogram on the y-axis, the apparatus for recognizing an image determines that reflected light does not exist, and proceeds to step 520. In step 520, the apparatus for recognizing an image recognizes an image by using an image frame. The methodology then proceeds to step 550 to determine whether image recognition is completed.

When there is a pixel having a value exceeding the threshold on the x-axis in the histogram on the x-axis and there is a pixel having a value exceeding the threshold on the y-axis in the histogram on the y-axis, the apparatus for recognizing an image estimates a region of reflected light by using the position of the pixel, in step 525.

For example, as shown in FIG. 6, when combining a pixel interval exceeding the threshold on the x-axis with a pixel interval exceeding the threshold on the y-axis, the apparatus for recognizing an image may estimate the position of a region 630 of reflected light. As described above, when detecting the position of the region 630 of reflected light, the apparatus for recognizing an image may also detect of the size of the region 630 of reflected light.

Accordingly, in step 530, the apparatus for recognizing an image determines whether the size of the estimated region of reflected light is less than or equal to a predetermined region size. When the size of the estimated region of reflected light is less than or equal to the predetermined region size, the apparatus for recognizing an image recognizes an image by using a remaining region, in step 545. The remaining region excludes the region 630 of reflected light in an image frame 600, as shown in FIG. 6. The methodology then proceeds to step 550 to determine whether image recognition is completed.

When the size of the estimated region of reflected light is greater than the predetermined region size, the apparatus for recognizing an image changes the current lighting to another lighting, in step 535, and discards the current image frame, in step 540. Thereafter, the methodology proceeds to step 550 to determine whether image recognition is completed. When image recognition is not completed, the apparatus for recognizing an image returns to step 500 and repeatedly performs the above process. When image recognition is completed, the methodology terminates.

The predetermined region size may be changed according to the position of a region of reflected light. For example, when a region of reflected light is generated at an edge of the image frame, the generated region of reflected light may not have a strong influence on obtaining coordinates that are required to recognize an image. Therefore, the predetermined region size may be relatively large. However, when a region of reflected light is generated at the center of the image frame, the generated region of reflected light may have a strong influence on image recognition. Therefore, the predetermined region size may be relatively small.

As described above, according to the embodiments of the present invention, the apparatus for recognizing an image determines the position of a region that cannot be recognized in an image frame, and an image can be recognized using a remaining region. Therefore, an image recognition rate can be increased.

According to embodiments of the present invention, the apparatus for recognizing an image that uses multiple illuminators, selects lighting according to whether an image can be recognized, thereby increasing in an image recognition rate.

Also, according to embodiments of the present invention, the apparatus for recognizing an image first determines whether an image has reflected light, and does not perform an operation for recognizing an image having reflected light with a brightness greater than or equal to a predetermined value. Therefore, it is possible to prevent an unintended result by incorrectly recognizing an image due to reflected light.

Software components including instructions or code for performing the methodologies described herein may be stored in one or more of associated memory devices and, when ready to be utilized, loaded in part or in whole and executed by the controller.

The term "memory" is an example of a computer readable storage medium. By way of example, and not limitation, computer readable storage media may include volatile and non-volatile, removable and non-removable media implemented in any method or technology for storage of information such as computer readable instructions, data structures, program modules, or other data. Computer readable storage media includes, but is not limited to, Random Access Memory (RAM), Read Only Memory (ROM), Electronically Erasable Programmable ROM (EEPROM), flash memory, or other memory technology, Compact Disc ROM (CD-ROM), Digital Versatile Discs (DVD) or other optical storage devices, or any other medium which can be used to store the desired information and which can be accessed by the computing system. The computer readable storage medium may have computer-readable instructions for generating and executing the prediction model.

While the present invention has been shown and described with reference to certain embodiments thereof, it will be understood by those skilled in the art that various changes in form and detail may be made therein without departing from the spirit and scope of the present invention as is defined by the appended claims and their equivalents.

What is claimed is:

1. An apparatus for recognizing an image with an increased image recognition rate, the apparatus comprising:
   a plurality of illuminators for illuminating a surface;
   an image sensor for outputting an image frame obtained by converting an optical image of the surface into an electrical signal, wherein the surface is illuminated by one of the plurality of illuminators;
   a switch for selecting any of the plurality of illuminators for illuminating the surface; and
   a controller for receiving the image frame from the image sensor, determining whether the image frame has a region of reflected light, and controlling the switch to select another of the plurality of illuminators to illuminate the surface when the image frame has the region of reflected light, wherein the region of reflected light comprises a number of pixels, each having a brightness value greater than or equal to a reference brightness, that exceeds a predetermined threshold number.

2. The apparatus as claimed in claim 1, wherein the controller divides the image frame into a plurality of regions when the image frame is input, determines whether the region of reflected light exists among the divided regions, and recognizes the image by using a remaining region, excluding the region of reflected light, when the region of reflected light exists among the divided regions.

3. The apparatus as claimed in claim 1, wherein the controller calculates a brightness average of all pixels in the image frame when the region of reflected light is smaller than a predetermined size, and recognizes the image by using the image frame when the calculated brightness average is greater than or equal to a predetermined threshold average.

4. The apparatus as claimed in claim 3, wherein the controller controls the switch to select the other illuminator when the calculated brightness average is less than the predetermined threshold average.

5. The apparatus as claimed in claim 1, wherein the controller discards the image frame when the region of reflected light is included.

6. The apparatus as claimed in claim 1, wherein the apparatus for recognizing the image comprises an electronic pen.

7. A method for increasing an image recognition rate in an apparatus for recognizing an image, the method comprising the steps of:
   illuminating a surface with one of a plurality of illuminators;
   receiving an image frame generated by capturing the illuminated surface;
   determining whether the image frame has a region of reflected light, wherein the region of reflected light comprises a number of pixels, each having a brightness value greater than or equal to a reference brightness, that exceeds a predetermined threshold number; and
   changing to another of the plurality of illuminators when the image frame has the region of reflected light.

8. The method as claimed in claim 7, further comprising:
   dividing the image frame into a plurality of regions when the image frame is received;
   determining whether the region of reflected light exists among the divided regions; and
   recognizing the image by using a remaining region, excluding the region of reflected light, when the region of reflected light exists among the divided regions.

9. The method as claimed in claim 7, further comprising:
   calculating a brightness average of all pixels in the image frame when the region of reflected light is smaller than a predetermined size; and
   recognizing the image by using the image frame when the calculated brightness average is greater than or equal to a predetermined threshold average.

10. The method as claimed in claim 9, further comprising changing to the other illuminator when the calculated brightness average is less than the predetermined threshold average.

11. The method as claimed in claim 7, further comprising discarding the image frame when the region of reflected light is included.

12. The method as claimed in claim 7, wherein the apparatus for recognizing the image comprises an electronic pen.

13. An article of manufacture for increasing an image recognition rate in an apparatus for recognizing an image, comprising a machine readable medium containing one or more programs which when executed implement the steps of:
   illuminating a surface with one of a plurality of illuminators;
   receiving an image frame generated by capturing the illuminated surface;
   determining whether the image frame has a region of reflected light, wherein the region of reflected light comprises a number of pixels, each having a brightness value greater than or equal to a reference brightness, that exceeds a predetermined threshold number; and
   changing to another of the plurality of illuminators when the image frame has the region of reflected light.

* * * * *